(12) United States Patent
Misada

(10) Patent No.: US 9,109,630 B2
(45) Date of Patent: Aug. 18, 2015

(54) ROLLING BEARING UNIT

(71) Applicant: JTEKT CORPORATION, Osaka-shi, Osaka (JP)

(72) Inventor: Yasuharu Misada, Nara (JP)

(73) Assignee: JTEKT CORPORATION, Osaka (JP)

(*) Notice: Subject to any disclaimer, the term of this patent is extended or adjusted under 35 U.S.C. 154(b) by 0 days.

(21) Appl. No.: 14/149,883

(22) Filed: Jan. 8, 2014

(65) Prior Publication Data

US 2014/0199010 A1 Jul. 17, 2014

(30) Foreign Application Priority Data

Jan. 15, 2013 (JP) ................. 2013-004501

(51) Int. Cl.
*F16C 33/46* (2006.01)
*F16C 33/66* (2006.01)
*F16C 33/58* (2006.01)
*F16C 33/60* (2006.01)
*F16C 37/00* (2006.01)

(52) U.S. Cl.
CPC ........... *F16C 33/6629* (2013.01); *F16C 33/586* (2013.01); *F16C 33/605* (2013.01); *F16C 33/6611* (2013.01); *F16C 33/6614* (2013.01); *F16C 33/6648* (2013.01); *F16C 33/6651* (2013.01); *F16C 33/6681* (2013.01); *F16C 37/007* (2013.01)

(58) Field of Classification Search
CPC ............ F16C 33/3806; F16C 33/6837; F16C 33/3843; F16C 33/385; F16C 33/3856; F16C 33/4605; F16C 33/66; F16C 33/6603; F16C 33/6629; F16C 33/6607; F16C 33/6614; F16C 33/6618; F16C 33/586; F16C 33/605; F16C 37/007; F16C 19/04; F16C 19/06; F16C 19/14; F16C 19/16; F16C 19/163; F16C 33/3837; F16C 33/6611; F16C 33/6648; F16C 33/6651; F16C 33/6681
USPC .......................................... 384/470, 473–475
See application file for complete search history.

(56) References Cited

U.S. PATENT DOCUMENTS 3,649,093 A * 3/1972 Muratore et al. ............. 384/463
3,829,183 A * 8/1974 Hingley ........................ 384/565
4,907,898 A * 3/1990 Dickinson .................... 384/564

(Continued)

FOREIGN PATENT DOCUMENTS

JP 2010-091067 A 4/2010
JP A-2011-58520 3/2011

OTHER PUBLICATIONS

Feb. 2, 2015 Search Report issued in European Application No. EP 14150899.4.

*Primary Examiner* — Alan B Waits
(74) *Attorney, Agent, or Firm* — Oliff PLC

(57) ABSTRACT

A rolling bearing unit includes: a rolling bearing having an inner ring, an outer ring arranged, multiple rolling elements, and a cage; and a cage guide member that is formed integrally with the outer ring or formed as a member different from the outer ring, and that is fixed to the housing side. The cage guide member has a guide projection projected into an annular space between the inner and outer rings and having an outer peripheral face a part of which serves as the guide face, and a grease supply portion having a grease reservoir portion in which the grease is reserved. A supply port through which the grease is supplied from the grease reservoir portion to the guide face is formed on the outer peripheral face of the guide projection, at a position closer to a base end portion of the guide projection than the guide face.

8 Claims, 3 Drawing Sheets

(56) References Cited

U.S. PATENT DOCUMENTS

| | | |
|---|---|---|
| 7,771,122 B2 * | 8/2010 | Nagai .......................... 384/470 |
| 8,262,290 B2 * | 9/2012 | Feldmeier ..................... 384/470 |
| 2010/0202720 A1 * | 8/2010 | Kobayashi et al. ........... 384/474 |
| 2011/0206306 A1 | 8/2011 | Urano |
| 2012/0301065 A1 * | 11/2012 | Mori et al. .................... 384/469 |

* cited by examiner

ROLLING BEARING UNIT

INCORPORATION BY REFERENCE

The disclosure of Japanese Patent Application No. 2013-004501 filed on Jan. 15, 2013 including the specification, drawings and abstract is incorporated herein by reference in its entirety.

BACKGROUND OF THE INVENTION

1. Field of the Invention

The invention relates to a rolling bearing unit including a rolling bearing and a grease supply portion that supplies grease to the rolling bearing.

2. Description of Related Art

A rolling bearing unit including a rolling bearing and a grease supply portion that supplies grease to the rolling bearing is described in, for example, Japanese Patent Application Publication No. 2011-58520 (JP 2011-58520 A). In the rolling bearing unit, an annular grease reservoir forming member in which a grease reservoir is formed is arranged radially inward of a spacer located adjacent to an outer ring of the rolling bearing. The grease reservoir forming member has a clearance forming piece having a distal end face on which projections that contact, at their distal ends, a step face of the outer ring are formed. Gaps between the step face and portions of the distal end face of the clearance forming piece, at which no projections are formed, serve as passages through which base oil of grease is introduced from the grease reservoir to a raceway surface of the outer ring.

However, if a certain kind of grease is used in the bearing unit described in JP 2011-58520 A, base oil is less likely to be separated from the grease. In this case, there is a possibility that the base oil will not be supplied to the raceway surface, causing adverse effects on lubrication of the bearing. Separation of the base oil from the grease is promoted by heating the grease. However, the grease reservoir forming member is located apart from the bearing. Therefore, the heat generated through the operation of the bearing is less likely to be transmitted to the grease reservoir forming member, and separation of the base oil from the grease is less likely to be promoted. For some rotary shafts that rotate at high speed, such as a spindle of a machine tool, a cooling system may be provided. The cooling system is provided in a housing and used to cool a bearing fitted to the rotary shaft. Thus, an increase in the temperature of the bearing due to the operation of the rotary shaft is suppressed. However, when the influence of the cooling system is exerted from the housing on the bearing fitted to the rotary shaft, separation of the base oil from the grease is further less likely to occur, causing a possibility that satisfactory bearing lubricating performance will not be ensured.

SUMMARY OF THE INVENTION

One object of the invention is to provide a rolling bearing unit configured such that separation of base oil from grease in a grease reservoir portion is promoted and the base oil of the grease is appropriately supplied.

A rolling bearing unit according to an aspect of the invention includes: a rolling bearing having an inner ring arranged on a rotary shaft, an outer ring arranged on an inner peripheral face of a housing, a plurality of rolling elements rollably arranged in an annular space between the inner ring and the outer ring, and a cage that holds the rolling elements; and a cage guide member that is formed integrally with the outer ring or formed as a member different from the outer ring, that is fixed to the housing, and that has a guide face that guides an inner peripheral face of the cage while supplying grease. The cage guide member has a guide projection projected into the annular space and having an outer peripheral face a part of which serves as the guide face, and a grease supply portion having a grease reservoir portion in which the grease is reserved, and a supply port through which the grease is supplied from the grease reservoir portion to the guide face and which is formed on the outer peripheral face of the guide projection, at a position closer to a base end portion of the guide projection than the guide face.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, example embodiments of the invention will be described with reference to the accompanying drawings.

Figure 1:
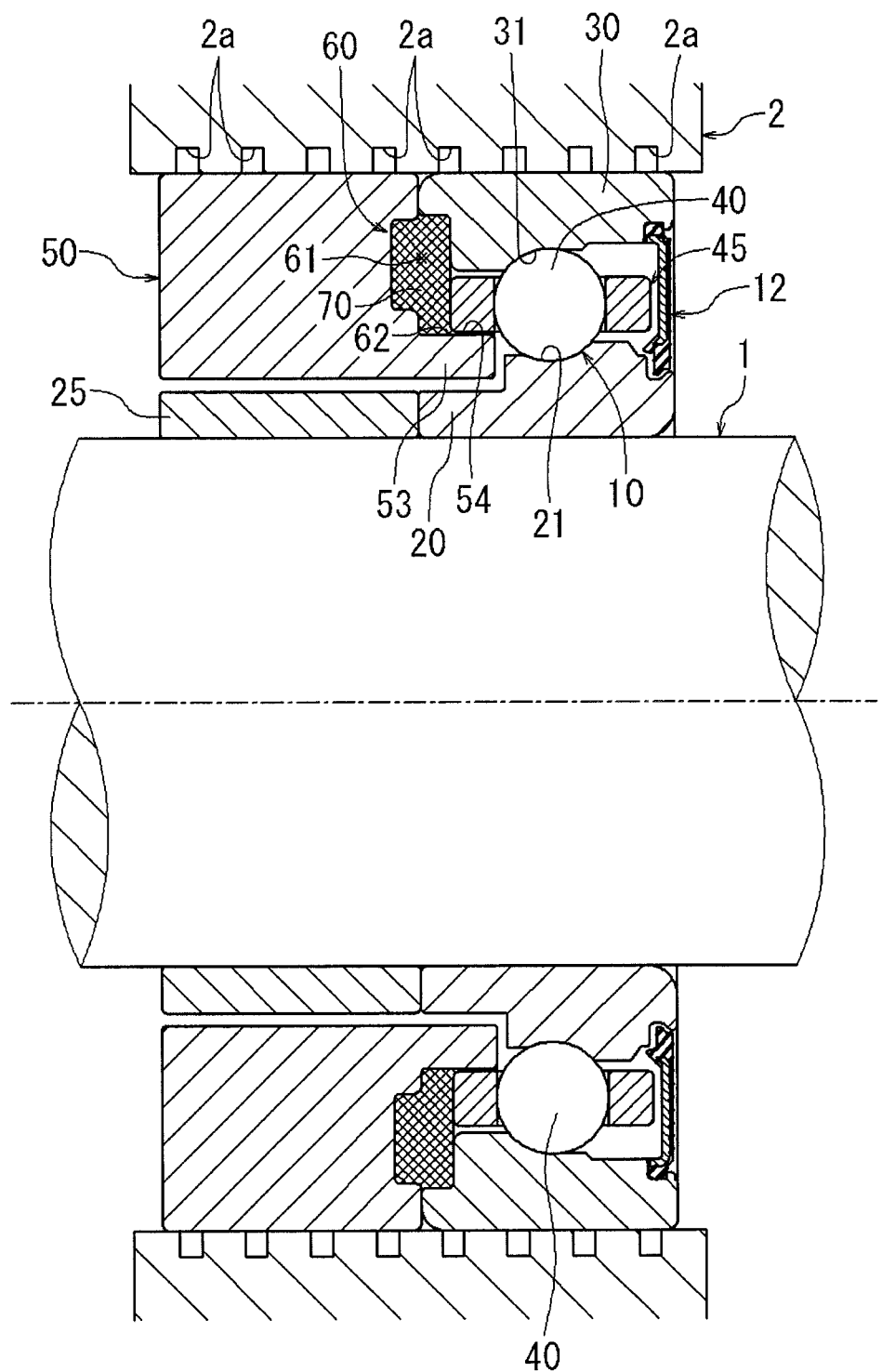
FIG. 1 is a sectional view of a rolling bearing unit according to a first embodiment of the invention, taken along the axial direction of the rolling bearing unit.

A first embodiment of the invention will be described with reference to FIG. 1 and FIG. 2. As illustrated in FIG. 1, a rolling bearing unit includes a rolling bearing 10 (an angular contact ball bearing in the first embodiment) and a grease supply portion 60. The grease supply portion 60 supplies grease (mainly base oil of the grease) to the rolling bearing 10. The rolling bearing 10 includes an inner ring 20, an outer ring 30, a plurality of rolling elements (balls in the first embodiment) 40 and a cage 45

The inner ring 20 is formed into a cylindrical shape, and has an inner peripheral face that defines a center hole. The inner ring 20 is fitted (press-fitted) at its inner peripheral face to an outer peripheral face of a rotary shaft 1 (for example, a spindle of a machine tool) so that the inner ring 20 is rotatable together with the rotary shaft 1. Note that, in the first embodiment, "outer peripheral face" means an outer face of a member in the radial direction with respect to the rotating center of the rotary shaft 1. In addition, "inner peripheral face" means an inner face of a member in the radial direction with respect to the rotating center of the rotary shaft 1. As illustrated in FIG. 2, an inner ring raceway surface 21 is formed in substantially the axially center portion of an outer peripheral face of the inner ring 20, and raceway shoulder portion portions 22, 23 are formed on respective sides of the inner ring raceway surface 21. In the first embodiment, the raceway shoulder portion 22 located on the right side in FIG. 2 has an outer peripheral face of which the outer diameter is greater, by a prescribed amount, than that of an outer peripheral face of the raceway shoulder portion 23 located on the left side in FIG. 2. A stepped portion 23a having an outer diameter that is smaller, by an appropriate amount, than that of the raceway shoulder portion 23 is formed axially outward of the raceway shoulder portion 23 located at a left side portion of the outer peripheral face of the inner ring 20.

As illustrated in FIG. 1, the outer ring 30 is formed into a cylindrical shape, and is arranged on the same central axis as that of the inner ring 20. The outer ring 30 is arranged radially outward of the inner ring 20 across an annular space. The outer ring 30 has an outer peripheral face that is fixedly fitted to a housing 2. As illustrated in FIG. 2, an outer ring raceway surface 31 is formed in substantially the axially center portion of the inner peripheral face of the outer ring 30, and raceway shoulder portion portions 32, 33 are formed on respective sides of the outer ring raceway surface 31. In the first embodiment, the raceway shoulder portion 32 located on the right side in FIG. 2 has an inner peripheral face of which the inner diameter is greater than that of an inner peripheral face of the raceway shoulder portion 33 located on the left side in FIG. 2. A stepped portion 33a having an inner diameter that is larger, by an appropriate amount, than that of the raceway shoulder portion 33 is formed axially outward of the raceway shoulder portion 33 located at a left side portion of the inner peripheral face of the outer ring 30. The rolling elements 40 are arranged in an annular space formed between the inner ring raceway surface 21 and the outer ring raceway surface 31, and rollably held by the cage 45.

A seal member 12 is fitted in an opening at one end side (right side in FIG. 1) of the annular space between the inner ring 20 and the outer ring 30 so as to seal the opening. A fixing portion 13 is formed at an outer peripheral portion of the seal member 12, and is press-fitted and fixed in an annular groove formed in one end portion of the inner peripheral face of the outer ring 30. In addition, a non-contact seal portion 14 is formed at an inner peripheral portion of the seal member 12, and is fitted in an annular groove formed in one end portion of the outer peripheral face of the inner ring 20 with a slight gap so as to form a labyrinth. Cooling grooves 2a are formed in an inner peripheral face of a bearing fitted portion in the housing 2 so as to constitute a cooling system. A cooling medium such as cooling oil or coolant is supplied to the cooling grooves 2a.

Figure 2:
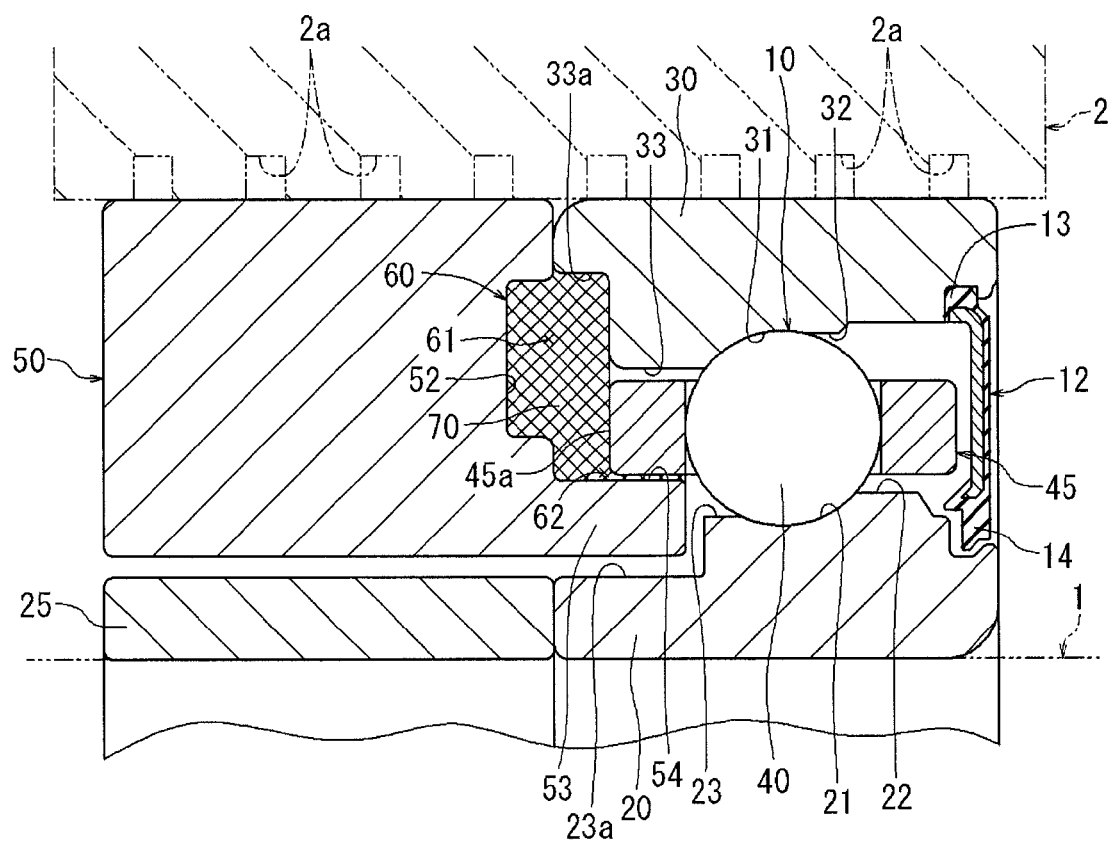
FIG. 2 is an enlarged sectional view of the rolling bearing unit, taken along the axial direction.

As illustrated in FIG. 1 and FIG. 2, an inner ring spacer 25 is press-fitted and fixed to the outer peripheral face of the rotary shaft 1 so as to be adjacent to at least one of side portions of the inner ring 20. In the first embodiment, the inner ring spacer 25 is arranged on the other side of the inner ring 20 and the outer ring 30. In the first embodiment, a cage guide member 50 is arranged on the other end side of the outer ring 30. The cage guide member 50 is arranged in the housing 2 so as to be adjacent to at least one of side portions of the outer ring 30. In the first embodiment, the cage guide member 50 is a member different from the outer ring 30, and is press-fitted and fixed to the housing 2. Note that the cage guide member 50 may be integrally formed with the outer ring 30, that is, the cage guide member 50 may be formed as a part of the outer ring 30. In the case where the cage guide member 50 is provided as a member different from the outer ring 30, the cage guide member 50 may be used as an outer ring spacer. The cage guide member 50 is in contact with an inner peripheral face of the cage 45 to guide the cage 45 while supplying grease, as will be described later in detail. The outer diameter of the cage guide member 50 is slightly larger than the inner diameter of the bearing fitted portion of the housing 2, and the inner diameter of the cage guide member 50 is larger, by an appropriate amount, than both the outer diameter of the inner ring spacer 25 and the outer diameter of the stepped portion 23a at the end portion of the outer peripheral face of the inner ring 20.

A guide projection 53 is formed on one end face of the cage guide member 50, which faces the outer ring 30. The guide projection 53 projects into the annular space between the inner ring 20 and the outer ring 30. The outer diameter of the guide projection 53 is slightly smaller than the inner diameter of the cage 45. A guide face 54 is formed in a part of an outer peripheral face of the guide projection 53. The guide projection 53 is in contact with the inner peripheral face of the cage 45 and guides the rotation of the cage 45. The inner diameter of the guide projection 53 is equal to the inner diameter of the cage guide member 50. An inner peripheral face of the cage guide member 50 is flush with and continuous with an inner peripheral face of the guide projection 53.

The cage guide member 50 has the guide projection 53 and the grease supply portion 60. The grease supply portion 60 supplies the grease to the guide face 54 of the guide projection 53. The grease supply portion 60 has a grease reservoir portion 61 in which the grease is reserved. A supply port 62 is formed on the outer peripheral face of the guide projection 53, at a position closer to the base end portion (root portion) of the guide projection 53 than the guide face 54. Through the supply port 62, the grease is supplied from the grease reservoir portion 61 to the guide face 54 and then to the rolling elements 40, the inner ring raceway surface 21 and the outer ring raceway surface 31 of the rolling bearing 10. Specifically, in the first embodiment, the grease supply portion 60 is formed of a space surrounded by a side surface of the cage guide member 50, the outer ring 30 and one axial end face 45a of the cage 45. An outer peripheral face section, that is, a part of the outer peripheral face of the guide projection 53, which is closer to the base end portion of the guide projection 53 than the supply port 62, constitutes a part of an inner wall face of the grease supply portion 60. The outer peripheral face section that is closer to the base end portion of the guide projection 53 than the supply port 62 is in contact with the grease reserved in the grease supply portion 60. When the rotary shaft 1 is rotated, a space of the grease supply portion 60 is ensured between the one axial end face 45a of the cage 45 and a wall face of the cage guide member 50 under centrifugal force. In the first embodiment, a recess 52 is formed in the wall face of the cage guide member 50, which constitutes a part of one side wall of the grease supply portion 60, and the capacity of the grease reservoir portion 61 is increased by the recess 52. In the first embodiment, the capacity of the grease reservoir portion 61 is further increased by the stepped portion 33a formed in one end portion of the inner peripheral face of the outer ring 30.

The rolling bearing unit according to the first embodiment has the above-described configuration. Therefore, in the first embodiment, a part of the outer peripheral face of the guide projection 53, which projects into the annular space between the inner ring 20 and the outer ring 30, more specifically, the outer peripheral face of the distal end portion of the guide projection 53 serves as the guide face 54 for the cage 45. Further, the supply port 62, through which the grease is supplied from the grease reservoir portion 61 to the guide face 54, is formed on the outer peripheral face of the guide projection 53, at a position closer to the base end portion of the guide projection 53 than the guide face 54. Therefore, the heat generated by sliding friction between the inner peripheral face of the cage 45 and the guide face 54 of the cage guide member 50 is transmitted through the guide projection 53 from its distal end to its base end portion. Thus, a part of the grease reserved in the grease reservoir portion 61, which is located near the supply port 62, is influenced by the heat generated at the guide face 54.

In the conventional outer ring guidance configuration (not illustrated) in which an outer peripheral face of a cage is guided on an inner peripheral face of an outer ring, the heat generated at a guide face is transmitted to a grease reservoir portion via the outer ring. Therefore, the influence of cooling by a cooling system (the cooling system is formed mainly of, for example, cooling grooves which are formed in an inner peripheral face of a bearing fitted portion of a housing and to which cooling medium such as cooling oil or coolant is supplied) provided in the housing, and the heat are uniformly transmitted to the entirety of the outer ring. As a result, the heat transmitted to the grease reservoir portion is apparently lower than the heat generated at the guide face.

In the first embodiment, because the influence of cooling by the cooling system (cooling grooves 2a) formed in the housing 2 is suppressed to transmit a sufficient amount of heat to the grease reservoir portion 61 and because the heat is transmitted via only the guide projection 53, the diffusion of the heat is suppressed. Therefore, the difference between the heat generated at the guide face 54 and the heat transmitted to the grease reservoir portion 61 is smaller than that in the conventional outer ring guidance configuration. That is, the heat is efficiently transmitted to the grease reservoir portion 61, and accordingly, thermal separation of the base oil from the grease easily occurs. As a result, it is possible to promote supply of the base oil to the guide face 54 via the outer peripheral face of the guide projection 53. In view of the facts that the circumferential velocity is reduced and the contact between the cage 45 and the guide projection 53 is reduced due to centrifugal force, the total amount of heat generated at the guide face 54 is smaller than that in the outer ring guidance configuration. Therefore, employment of the configuration in the first embodiment makes it possible to both suppress an increase in the temperature of the rolling bearing 10 and appropriately supply the base oil, unlike in the outer ring guidance configuration. Thus, while the rotary shaft 1 is rotated at high speed, a required amount of base oil is reliably supplied from the supply port 62 into the space between the inner peripheral face of the cage 45 and the guide face 54. As a result, it is possible to suppress thermal deformation and seizure of the cage 45, and to maintain an appropriate bearing function for a long time.

Especially, in the first embodiment, the outer peripheral face section, that is, a part of the outer peripheral face of the guide projection 53, which is closer to the base end portion of the guide projection 53 than the supply port 62, constitutes a part of the inner wall face of the grease supply portion 60. Because the outer peripheral face section, which is closer to the base end portion of the guide projection 53 than the supply port 62, is in contact with the grease reserved in the grease supply portion 60, the grease is influenced by heat through the surface. Thus, the heat is efficiently transmitted. Further, in the first embodiment, because the cage guide member 50 is formed of a member that is different from the outer ring 30, the cage guide member 50 may be used as an outer ring spacer. Because the cage guide member 50 may be used also as the outer ring spacer, the cage guide member 50 is effectively used. Further, in the first embodiment, the grease reservoir portion 61 is formed of a space surrounded by the cage guide member 50, the outer ring 30 and the one axial end face 45a of the cage 45. Thus, the grease reservoir portion 61 is formed more easily than in a case where a grease reservoir portion is formed in a cage guide member. Further, separation of the base oil from the grease 70 in the grease reservoir portion 61 is promoted also by frictional heat generated at the cage 45.

Figure 3:
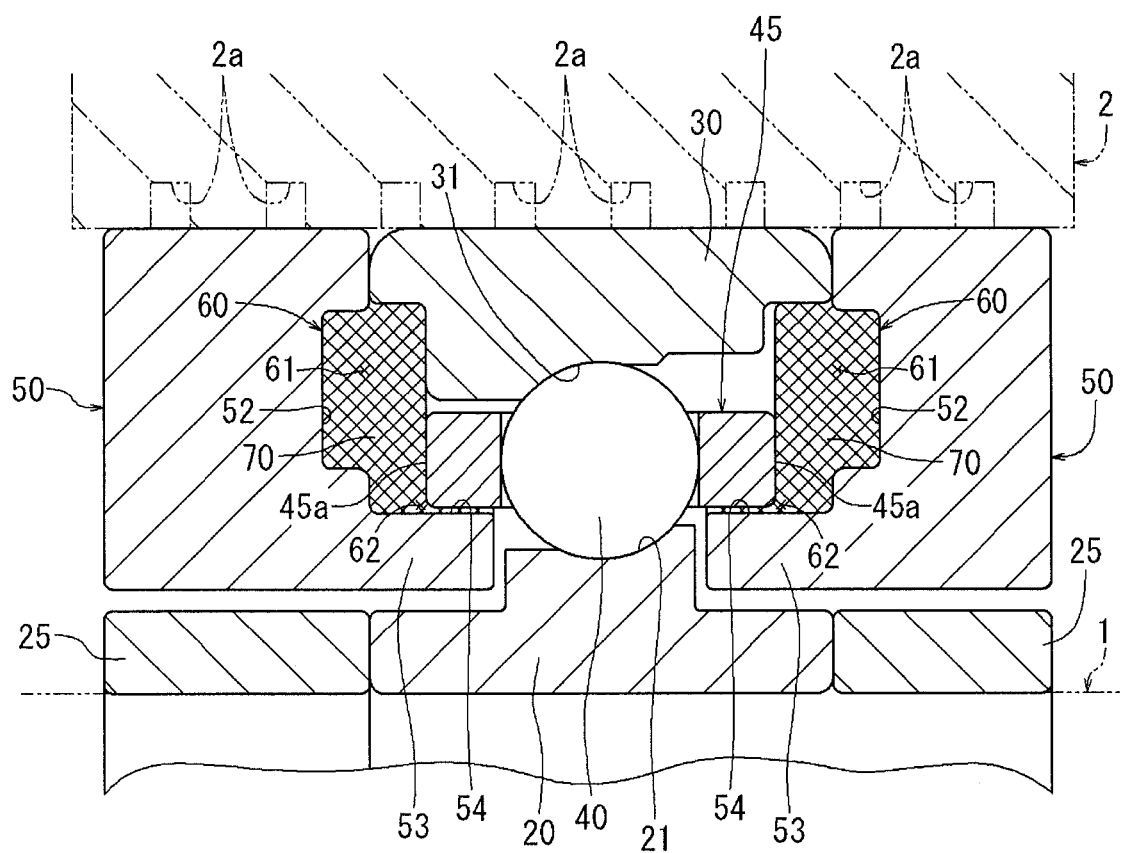
FIG. 3 is a sectional view of a rolling bearing unit according to a second embodiment of the invention, taken along the axial direction of the rolling bearing unit.

Next, a second embodiment of the invention will be described with reference to FIG. 3. In the second embodiment, as illustrated in FIG. 3, inner ring spacers 25 are press-fitted and fixed to the outer peripheral face of the rotary shaft 1 so as to be adjacent to respective side portions of the inner ring 20. Cage guide members 50 that also serve as outer ring spacers are arranged in the housing 2 so as to be adjacent to respective side portions of the outer ring 30. Guide projections 53 are formed on respective end faces of the cage guide members 50, which face the outer ring 30. Guide faces 54 that guide the rotation of the cage 45 are formed respectively on the outer peripheral faces of these cage guide members 50.

Two grease reservoir portions 61 are formed of spaces that are surrounded by the respective cage guide members 50, the outer ring 30 and respective axial end faces 45a of the cage 45. Because the other configurations in the second embodiment are the same as those in the first embodiment, the same configurations as those in the first embodiment will be denoted by the same reference numerals as those in the first embodiment, and description thereof will be omitted.

In the thus configured rolling bearing unit in the second embodiment, the cage 45 is restrained from tilting by the guide faces 54 that are formed on the outer peripheral faces of the guide projections 53 of the cage guide members 50, and therefore rotation of the cage 45 is guided more stably. The grease 70 is reserved in the two grease reservoir portions 61. Therefore, the base oil of the grease 70 in the two grease reservoir portion 61 is reliably supplied to the spaces between the guide faces 54 and the inner peripheral face of the cage 45.

Note that the invention is not limited to the first embodiment and the second embodiment, and may be implemented in various other embodiments within the scope of the invention. For example, in the first and second embodiments, the grease reservoir portion 61 is formed of the space surrounded by cage guide member 50, the outer ring 30 and the axial end face 45a of the cage 45. Alternatively, the invention may be implemented if the grease reservoir portion 61 is formed in the cage guide member 50. In the first embodiment, the outer ring 30 and the cage guide member 50 are formed as different members. Alternatively, the cage guide member 50 may be formed integrally with one end portion of the outer ring 30 to form the outer ring 30 and the cage guide member 50 as a single-piece member.

What is claimed is:

1. A rolling bearing unit comprising:
a rolling bearing having an inner ring arranged on a rotary shaft, an outer ring arranged on an inner peripheral face of a housing, a plurality of rolling elements rollably arranged in an annular space between the inner ring and the outer ring, and a cage that holds the rolling elements; and
a cage guide member that is formed integrally with the outer ring or formed as a member different from the outer ring, that is fixed to the housing, and that has a guide face that is in contact with an inner peripheral face of the cage to guide the cage while supplying grease, wherein
the cage guide member has a guide projection projecting into the annular space and having an outer peripheral face, a part of which serves as the guide face, and a grease supply portion having a grease reservoir portion in which the grease is reserved, and a supply port through which the grease is supplied from the grease reservoir portion to the guide face and which is formed on the outer peripheral face of the guide projection, at a position closer to a base end portion of the guide projection than a free end of the guide face.

2. The rolling bearing unit according to claim 1, wherein an outer peripheral face section of the outer peripheral face of the guide projection, the outer peripheral face section being closer to the base end portion than the supply port, constitutes a part of a wall face of the grease reservoir portion.

3. The rolling bearing unit according to claim 2, wherein the cage guide member is a member different from the outer ring, and serves as a spacer for the outer ring.

4. The rolling bearing unit according to claim 2, wherein a recess is formed in a side wall of the cage guide member, and forms the grease reservoir portion.

5. The rolling bearing unit according to claim 1, wherein the cage guide member is a member different from the outer ring, and serves as a spacer for the outer ring.

6. The rolling bearing unit according to claim 3, wherein a recess is formed in a side wall of the cage guide member, and forms the grease reservoir portion.

7. The rolling bearing unit according to claim 5, wherein a recess is formed in a side wall of the cage guide member, and forms the grease reservoir portion.

8. The rolling bearing unit according to claim 1, wherein a recess is formed in a side wall of the cage guide member, and forms the grease reservoir portion.

\* \* \* \* \*